United States Patent
Braithwaite et al.

(10) Patent No.: US 9,515,336 B2
(45) Date of Patent: *Dec. 6, 2016

(54) DIAPHRAGM PUMP FOR A FUEL CELL SYSTEM

(71) Applicant: Intelligent Energy Limited, Loughborough (GB)

(72) Inventors: Daniel Braithwaite, San Francisco, CA (US); Tibor Fabian, Mountain View, CA (US); Tobin J. Fisher, San Francisco, CA (US); Jonathan Louis Glassmann, Indianapolis, IN (US); Andrew Gust Peterson, San Francisco, CA (US); Adam Rodriguez, San Francisco, CA (US)

(73) Assignee: Intelligent Energy Limited, Loughborough (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/825,742

(22) Filed: Aug. 13, 2015

(65) Prior Publication Data

US 2015/0349357 A1 Dec. 3, 2015

Related U.S. Application Data

(63) Continuation of application No. 14/297,509, filed on Jun. 5, 2014, now Pat. No. 9,142,849, which is a
(Continued)

(51) Int. Cl.
*H01M 8/04* (2016.01)
*H01M 8/06* (2016.01)
(Continued)

(52) U.S. Cl.
CPC ............ *H01M 8/0606* (2013.01); *F04B 43/02* (2013.01); *F04B 43/04* (2013.01); *F04B 43/046* (2013.01);
(Continued)

(58) Field of Classification Search
CPC ............ H01M 8/0606; H01M 8/04089; H01M 8/04201; H01M 8/04208; H01M 8/065; H01M 8/04216; H01M 2008/1095; H01M 2250/30; F04B 43/02; F04B 43/04; F04B 43/046; F04B 53/10; F04B 53/14; Y02E 60/50
See application file for complete search history.

(56) References Cited

U.S. PATENT DOCUMENTS 3,262,801 A 7/1966 Lally et al.
3,774,589 A 11/1973 Kober
(Continued)

FOREIGN PATENT DOCUMENTS

DE 4221492 A1 1/1993
EP 1434292 A1 6/2004
(Continued)

OTHER PUBLICATIONS

Definition of course work technical terms. Southwest Tech, 2002-2006. [Retrieved on Feb. 8, 2012]. Retrieved from the Internet.
(Continued)

*Primary Examiner* — Raymond Alejandro
(74) *Attorney, Agent, or Firm* — Baker & Hostetler LLP

(57) ABSTRACT

A method of supplying fuel to a fuel cell system wherein a flexible diaphragm controls ingress and egress of liquid reactant. The method utilizes a pump assembly including a first subassembly and a second subassembly. The first subassembly includes a fluid conduit; an inlet fluidly coupled to the liquid reactant dispenser and the fluid conduit; an outlet fluidly coupled to a reaction chamber and the fluid conduit; and a diaphragm, defining a portion of the fluid conduit, that flexes to pump the liquid reactant from the inlet to the outlet. The diaphragm preferably includes an actuation point coupled to the diaphragm, wherein the liquid reactant is substantially contained within the first subassembly during
(Continued)

pumping. The second subassembly is couplable to the first subassembly, and is fluidly isolated from the liquid reactant wherein operation of the actuator causes diaphragm flexion.

20 Claims, 12 Drawing Sheets

Related U.S. Application Data continuation of application No. 13/286,044, filed on Oct. 31, 2011, now Pat. No. 8,795,926, which is a continuation-in-part of application No. 11/286,044, filed on Nov. 22, 2005, now abandoned.

(60) Provisional application No. 61/408,462, filed on Oct. 29, 2010.

(51) Int. Cl.
*F04B 43/04* (2006.01)
*F04B 53/10* (2006.01)
*F04B 53/14* (2006.01)
*F04B 43/02* (2006.01)
*H01M 8/10* (2016.01)

(52) U.S. Cl.
CPC .............. *F04B 53/10* (2013.01); *F04B 53/14* (2013.01); *H01M 8/04089* (2013.01); *H01M 8/04201* (2013.01); *H01M 8/04208* (2013.01); *H01M 8/065* (2013.01); *H01M 8/04216* (2013.01); *H01M 2008/1095* (2013.01); *H01M 2250/30* (2013.01); *Y02B 90/18* (2013.01); *Y02E 60/50* (2013.01)

(56) References Cited

U.S. PATENT DOCUMENTS

| | | |
|---|---|---|
| 4,042,528 A | 8/1977 | Abe |
| 4,261,956 A | 4/1981 | Adlhart |
| 4,419,457 A | 12/1983 | Tokunaga |
| 4,846,176 A | 7/1989 | Golden |
| 5,182,046 A | 1/1993 | Patton et al. |
| 5,374,564 A | 12/1994 | Bruel |
| 5,804,329 A | 9/1998 | Amendola |
| 5,817,157 A | 10/1998 | Checketts |
| 5,948,558 A | 9/1999 | Amendola |
| 6,106,801 A | 8/2000 | Bogdanovic et al. |
| 6,250,078 B1 | 6/2001 | Amendola et al. |
| 6,326,097 B1 | 12/2001 | Hockaday |
| 6,375,638 B2 | 4/2002 | Nason et al. |
| 6,392,313 B1 | 5/2002 | Epstein et al. |
| 6,433,129 B1 | 8/2002 | Amendola et al. |
| 6,468,694 B1 | 10/2002 | Amendola |
| 6,497,973 B1 | 12/2002 | Amendola |
| 6,524,542 B2 | 2/2003 | Amendola et al. |
| 6,534,033 B1 | 3/2003 | Amendola et al. |
| 6,534,950 B2 | 3/2003 | Leboe |
| 6,544,400 B2 | 4/2003 | Hockaday et al. |
| 6,544,679 B1 | 4/2003 | Petillo et al. |
| 6,579,068 B2 | 6/2003 | Bridger et al. |
| 6,586,563 B1 | 7/2003 | Ortega et al. |
| 6,645,651 B2 | 11/2003 | Hockaday et al. |
| 6,660,685 B1 | 12/2003 | Schussler et al. |
| 6,670,444 B2 | 12/2003 | Amendola et al. |
| 6,683,025 B2 | 1/2004 | Amendola et al. |
| 6,706,909 B1 | 3/2004 | Snover et al. |
| 6,713,201 B2 | 3/2004 | Bullock et al. |
| 6,723,072 B2 | 4/2004 | Flaherty et al. |
| 6,745,801 B1 | 6/2004 | Cohen et al. |
| 6,746,496 B1 | 6/2004 | Kravitz et al. |
| 6,796,898 B1 | 9/2004 | Timpano |
| 6,808,833 B2 | 10/2004 | Johnson |
| 6,818,334 B2 | 11/2004 | Tsang |
| 6,821,499 B2 | 11/2004 | Jorgensen |
| 6,834,623 B2 | 12/2004 | Cheng |
| 6,834,632 B2 | 12/2004 | Kataoka et al. |
| 6,840,955 B2 | 1/2005 | Ein |
| 6,849,351 B2 | 2/2005 | Hartnack et al. |
| 6,887,596 B2 | 5/2005 | Leban |
| 6,893,755 B2 | 5/2005 | Leboe |
| 6,916,159 B2 | 7/2005 | Rush et al. |
| 6,924,054 B2 | 8/2005 | Prasad et al. |
| 6,932,847 B2 | 8/2005 | Amendola et al. |
| 6,939,529 B2 | 9/2005 | Strizki et al. |
| 7,019,105 B2 | 3/2006 | Amendola et al. |
| 7,083,657 B2 | 8/2006 | Mohring et al. |
| 7,105,033 B2 | 9/2006 | Strizki et al. |
| 7,105,245 B2 | 9/2006 | Ohlsen et al. |
| 7,108,777 B2 | 9/2006 | Xu et al. |
| 7,214,439 B2 | 5/2007 | Ortega et al. |
| 7,220,290 B2 | 5/2007 | Amendola et al. |
| 7,282,073 B2 | 10/2007 | Petillo et al. |
| 7,316,718 B2 | 1/2008 | Amendola et al. |
| 7,316,719 B2 | 1/2008 | Devos |
| 7,323,148 B2 | 1/2008 | Shah et al. |
| 7,393,369 B2 | 7/2008 | Shurtleff |
| 7,527,661 B2 | 5/2009 | Chellappa et al. |
| 7,530,931 B2 | 5/2009 | Amendola et al. |
| 7,540,892 B2 | 6/2009 | Strizki et al. |
| 7,645,536 B2 | 1/2010 | Akiyama et al. |
| 7,662,435 B2 | 2/2010 | Chellappa et al. |
| 7,666,386 B2 | 2/2010 | Withers-Kirby et al. |
| 7,811,529 B2 | 10/2010 | Powell et al. |
| 7,867,300 B2 | 1/2011 | Chellappa et al. |
| 7,875,089 B2 | 1/2011 | Powell et al. |
| 7,922,781 B2 | 4/2011 | Chellappa et al. |
| 7,954,519 B2 | 6/2011 | Powell et al. |
| 8,100,993 B2 | 1/2012 | Fisher et al. |
| 9,142,849 B2 * | 9/2015 | Braithwaite ............ F04B 43/02 |
| 2002/0114985 A1 | 8/2002 | Shkolnik et al. |
| 2002/0182459 A1 | 12/2002 | Hockaday et al. |
| 2003/0009942 A1 | 1/2003 | Amendola et al. |
| 2003/0022034 A1 | 1/2003 | Suzuki |
| 2003/0037487 A1 | 2/2003 | Amendola et al. |
| 2003/0077494 A1 | 4/2003 | Aberle et al. |
| 2003/0082427 A1 | 5/2003 | Prasad et al. |
| 2003/0091879 A1 | 5/2003 | Rusta-Sellehy et al. |
| 2003/0138679 A1 | 7/2003 | Prased et al. |
| 2003/0198558 A1 | 10/2003 | Nason et al. |
| 2003/0235724 A1 | 12/2003 | Ord et al. |
| 2004/0011662 A1 | 1/2004 | Xu et al. |
| 2004/0013923 A1 | 1/2004 | Molter et al. |
| 2004/0048115 A1 | 3/2004 | Devos |
| 2004/0048132 A1 | 3/2004 | Takai et al. |
| 2004/0052704 A1 | 3/2004 | Devos |
| 2004/0053477 A1 | 3/2004 | Ghyselen et al. |
| 2004/0062965 A1 | 4/2004 | Morse et al. |
| 2004/0062978 A1 | 4/2004 | Yazici |
| 2004/0096721 A1 | 5/2004 | Ohlsen et al. |
| 2004/0131903 A1 | 7/2004 | Shioya |
| 2004/0136156 A1 | 7/2004 | Nakamura et al. |
| 2004/0148857 A1 | 8/2004 | Strizki et al. |
| 2004/0157409 A1 | 8/2004 | Ghyselen et al. |
| 2004/0197214 A1 | 10/2004 | Arthur et al. |
| 2004/0202548 A1 | 10/2004 | Dai et al. |
| 2004/0211054 A1 | 10/2004 | Morse et al. |
| 2004/0219409 A1 | 11/2004 | Isogai |
| 2004/0229101 A1 | 11/2004 | Davis |
| 2004/0247979 A1 | 12/2004 | Sato et al. |
| 2004/0253500 A1 | 12/2004 | Bourilkov et al. |
| 2005/0023236 A1 | 2/2005 | Adams et al. |
| 2005/0031931 A1 | 2/2005 | Kabumoto et al. |
| 2005/0036941 A1 | 2/2005 | Bae et al. |
| 2005/0037252 A1 | 2/2005 | Pham |
| 2005/0074641 A1 | 4/2005 | Inai et al. |
| 2005/0089415 A1 | 4/2005 | Cho et al. |
| 2005/0158595 A1 | 7/2005 | Marsh et al. |
| 2005/0158600 A1 | 7/2005 | Mitsuishi et al. |
| 2005/0170224 A1 | 8/2005 | Ren et al. |
| 2005/0181250 A1 | 8/2005 | Beckmann et al. |
| 2005/0238573 A1 | 10/2005 | Zhang et al. |
| 2006/0059778 A1 | 3/2006 | Shurtleff et al. |

(56) References Cited

U.S. PATENT DOCUMENTS

| | | |
|---|---|---|
| 2006/0073365 A1 | 4/2006 | Kaye |
| 2006/0110639 A1 | 5/2006 | Walter |
| 2006/0127734 A1 | 6/2006 | Mclean et al. |
| 2006/0172694 A1 | 8/2006 | Gau et al. |
| 2006/0194082 A1 | 8/2006 | Tucker et al. |
| 2006/0196112 A1 | 9/2006 | Berry et al. |
| 2006/0204802 A1 | 9/2006 | Specht |
| 2006/0275645 A1 | 12/2006 | Gallagher et al. |
| 2007/0002172 A1 | 1/2007 | Calvignac et al. |
| 2007/0020172 A1 | 1/2007 | Withers-Kirby et al. |
| 2007/0031711 A1 | 2/2007 | Miyata et al. |
| 2007/0036711 A1 | 2/2007 | Fisher et al. |
| 2007/0037027 A1 | 2/2007 | Oma |
| 2007/0037034 A1 | 2/2007 | Fisher et al. |
| 2007/0042244 A1 | 2/2007 | Spallone et al. |
| 2007/0068071 A1 | 3/2007 | Kelly et al. |
| 2007/0120872 A1 | 5/2007 | Satoh |
| 2007/0122668 A1 | 5/2007 | Suzuki et al. |
| 2007/0166595 A1 | 7/2007 | Akiyama et al. |
| 2007/0189960 A1 | 8/2007 | Yamamoto |
| 2007/0264546 A1 | 11/2007 | Laven |
| 2008/0025880 A1 | 1/2008 | Shurtleff et al. |
| 2008/0044691 A1 | 2/2008 | Wake et al. |
| 2008/0187798 A1 | 8/2008 | Mclean et al. |
| 2008/0203816 A1 | 8/2008 | Fujita |
| 2008/0220297 A1 | 9/2008 | Sarata et al. |
| 2008/0292541 A1 | 11/2008 | Kamada et al. |
| 2009/0092864 A1 | 4/2009 | Mclean et al. |
| 2009/0117420 A1 | 5/2009 | Nakakubo |
| 2009/0176135 A1 | 7/2009 | Saito et al. |
| 2009/0197125 A1 | 8/2009 | Salvador et al. |
| 2009/0269634 A1 | 10/2009 | Fabian et al. |
| 2009/0274595 A1 | 11/2009 | Fisher et al. |
| 2009/0304558 A1 | 12/2009 | Patton et al. |
| 2010/0150824 A1 | 6/2010 | Withers-Kirby et al. |
| 2010/0173214 A1 | 7/2010 | Fabian et al. |
| 2011/0020215 A1 | 1/2011 | Ryu et al. |
| 2011/0053016 A1 | 3/2011 | Braithwaite et al. |
| 2011/0070151 A1 | 3/2011 | Braithwaite et al. |
| 2011/0159386 A1 | 6/2011 | Kaupert et al. |
| 2011/0200495 A1 | 8/2011 | Braithwaite et al. |
| 2011/0311895 A1 | 12/2011 | Spare et al. |
| 2011/0313589 A1 | 12/2011 | Iyer et al. |
| 2012/0100443 A1 | 4/2012 | Braithwaite et al. |

FOREIGN PATENT DOCUMENTS

| | | |
|---|---|---|
| JP | 2002-234358 A | 8/2002 |
| JP | 2006-079891 A | 3/2006 |
| JP | 2007-157587 A | 6/2007 |
| WO | WO 00/12889 A1 | 3/2000 |
| WO | WO 2004/001235 A1 | 12/2003 |
| WO | WO 2005/049485 A1 | 6/2005 |
| WO | WO 2005/057703 A1 | 6/2005 |
| WO | WO 2005/123586 A2 | 12/2005 |
| WO | WO 2006/093735 A2 | 9/2006 |
| WO | WO 2007/021924 A2 | 2/2007 |
| WO | WO 2007/021934 A2 | 2/2007 |
| WO | WO 2007/035845 A2 | 3/2007 |
| WO | WO 2007/055146 A1 | 5/2007 |
| WO | WO 2007/109036 A2 | 9/2007 |
| WO | WO 2007/120872 A2 | 10/2007 |
| WO | WO 2011/011050 A2 | 1/2011 |
| WO | WO 2011/028242 A2 | 3/2011 |
| WO | WO 2012/054787 A1 | 4/2012 |
| WO | WO 2012/058688 A1 | 5/2012 |

OTHER PUBLICATIONS

Laser et al., "A Review of Micropumps," J. Micromech. Microeng.; vol. 14 (2004) R35-R64.

Schlesinger et al, "Sodium Borohydride, Its Hydrolysis and its Use as a Reducing Agent and in the Generation of Hydrogen," J. Am. Chem. Soc.; vol. 75 (Mar. 15, 1952), pp. 215-219.

Wu, "Hydrogen Storage via Sodium Borohydride: Current Status, Barriers & R&D Roadmap," Presentation presented at GCEP, Stanford University, Apr. 14-15, 2003.

Written Opinion of to International Searching Authority for PCT/US2010/02022.

Colinge; "Silicon-On-Insulator Technology"; Materials to VLSI, $2^{nd}$ Edition; 1997; p. 50-51.

\* cited by examiner

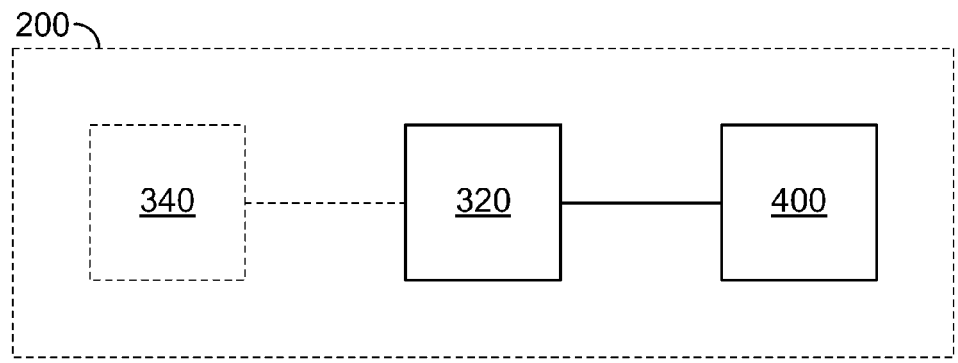
FIGURE 5
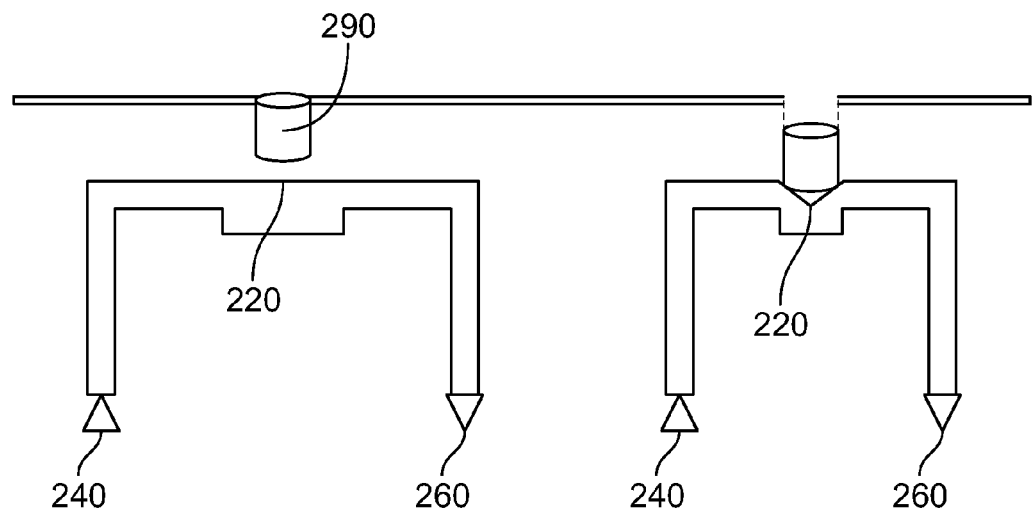
FIGURE 6A  FIGURE 6B

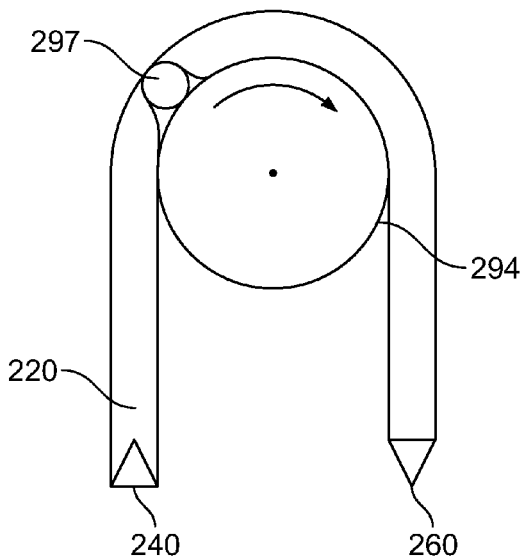
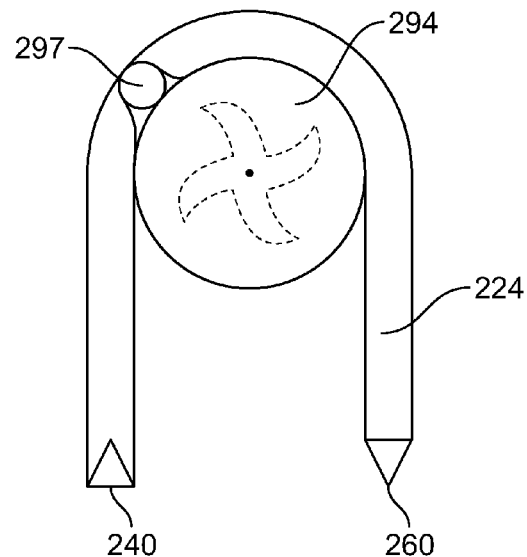
FIGURE 9A
FIGURE 9B
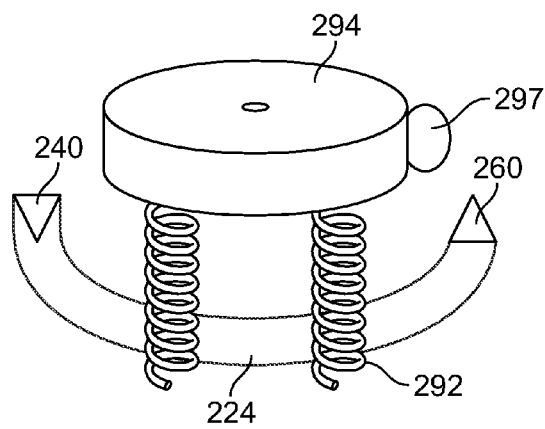
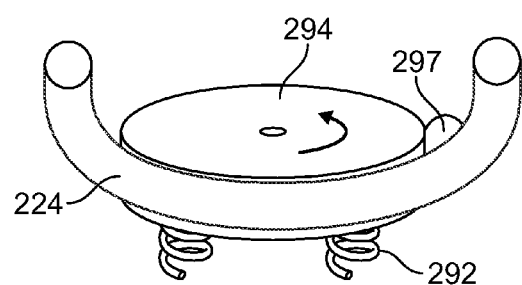
FIGURE 9C
FIGURE 9D

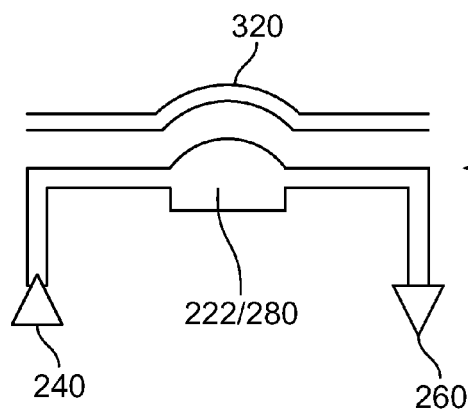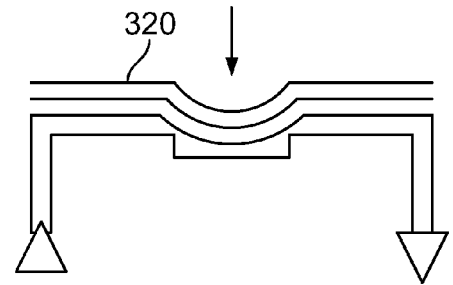
FIGURE 14A FIGURE 14B
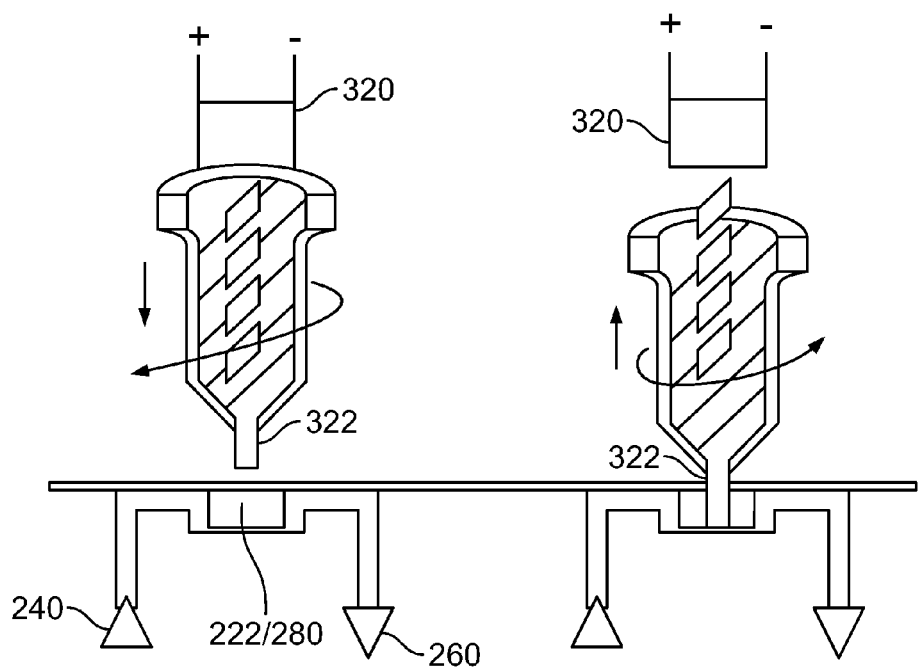
FIGURE 15A FIGURE 15B

DIAPHRAGM PUMP FOR A FUEL CELL SYSTEM

CROSS-REFERENCE TO RELATED APPLICATIONS

This application is a continuation of U.S. patent application Ser. No. 14/297,509, filed Jun. 5, 2014 and issued as U.S. Pat. No. 9,142,849 on Sep. 22, 2015, which is a continuation of U.S. patent application Ser. No. 13/286,044, filed Oct. 31, 2011 and issued as U.S. Pat. No. 8,795,926 on Aug. 5, 2014, the contents of which are incorporated by reference in their entirety. U.S. patent application Ser. No. 13/286,044 is a continuation-in-part of U.S. patent application Ser. No. 11/203,001, filed on Aug. 11, 2005 and issued as U.S. Pat. No. 8,187,758 on May 29, 2012, and also claims priority to U.S. Provisional Patent Application Ser. No. 61/408,462, filed on Oct. 29, 2010, the contents of each of which are incorporated by reference herein in their entireties.

FIELD OF THE INVENTION

This invention relates generally to the fuel cell field, and more specifically to a pump assembly for a fuel cell system.

BACKGROUND

Modern portable electronic devices are demanding increasing amounts of electrical power and chemical batteries are often the performance bottleneck for such devices. Wireless products, such as personal digital assistants, mobile phones, entertainment devices, and next generation laptops in particular have a great demand for sustained power. For long-term portable operations, fuel cells are an attractive solution. Fuel cells, like batteries, efficiently convert chemical energy into electricity, but have additional advantages, such as higher energy density and the capability for instant refueling. Fuel cells are typically fuelled by hydrogen gas, but there are technological challenges in storing and delivering hydrogen gas to the fuel cells in a cost effective and efficient manner. One particular challenge is to provide a fuel supply that is inexpensive, safe, light and compact enough to be readily portable yet store enough hydrogen to provide a useful amount of fuel to the fuel cell. State of the art means for storing hydrogen include metal hydride canisters to store hydrogen at relatively low pressures, and pressure tanks to store compressed hydrogen at elevated pressures. Both approaches have drawbacks; for example, metal hydride storage is relatively safe but has a low energy density to weight ratio, and compressed hydrogen may have a high energy density to weight ratio but requires high strength and expensive containment solutions.

Other efforts have been directed at generating hydrogen gas from a hydrogen-containing fuel precursor such as sodium borohydride. In such approaches, the fuel solution is exposed to a reactant to facilitate the production of hydrogen gas. This reactant is typically a liquid reactant that must be pumped to a reaction site. In conventional systems, the pump is either be placed within the fuel generator or within the fuel cell system. Placement of the pump within fuel generator allows for a simple fluid interface, requiring only a fuel outlet, but also increases the cost of the fuel generator, which is typically a disposable component and thus, cost sensitive. Placement of the pump within the fuel cell system decreases the cost of the fuel generator, but adds the technical complexities of managing multiple fluid ports, as the liquid reactant must be pumped into the fuel cell system and back into the fuel generator.

Therefore, there exists a need for a better pump assembly in the fuel cell system to pump liquid reactant to the reaction site. More specifically, there exists a need for a pump assembly that splits the pump actuator from the fluid-contacting components, effectively decreasing the cost of fuel generator while minimizing the technical complexities of the system arising from multiple fluid ports.

BRIEF DESCRIPTION OF THE FIGURES

FIG. 5 is a schematic representation of the second subassembly 300.

FIGS. 6A and 6B are schematic representations of the first subassembly with a first embodiment of an auxiliary component, wherein the diaphragm is in an unflexed state and a flexed state, respectively.

FIGS. 9A, 9B, 9C, and 9D are schematic representations of: the first subassembly with a third embodiment of an auxiliary component; the third embodiment of the auxiliary component further including a position retention mechanism; the third embodiment further including a return element in its relaxed state; and the third embodiment further including a return element in its compressed state, respectively.

FIGS. 14A and 14B are schematic representations of the first subassembly (bottom) coupled to the second subassembly 300 (top), wherein the second subassembly 300 includes a fourth embodiment of a linear actuator, shown in a retracted state and an extended state, respectively.

FIGS. 15A and 15B are schematic representations of the first subassembly (bottom) coupled to the second subassembly 300 (top), wherein the second subassembly 300 includes a fifth embodiment of a linear actuator, shown in a retracted state and an extended state, respectively.

DESCRIPTION OF THE PREFERRED EMBODIMENTS

The following description of the preferred embodiments of the invention is not intended to limit the invention to these preferred embodiments, but rather to enable any person skilled in the art to make and use this invention.

Figure 1:
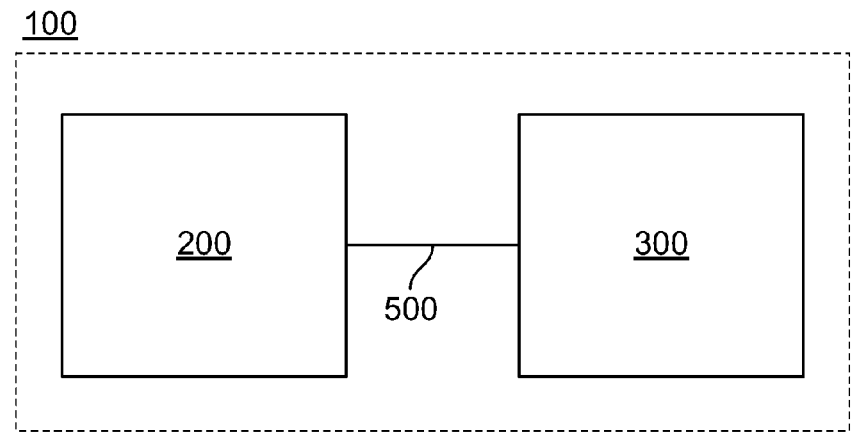
FIG. 1 is a schematic representation of the pump assembly.

As shown in FIG. 1, the pump assembly of the present invention includes a first subassembly 200 that pumps a liquid reactant from a liquid reactant dispenser to a reaction chamber, and a second subassembly 300 that induces pumping within the first subassembly 200, wherein the first subassembly substantially isolates the liquid reactant from the second subassembly 300. The pump assembly is preferably incorporated into a fuel cell system 100 including a fuel generator 120 and a fuel cell arrangement 140, and is preferably used to move a liquid reactant 244 within the fuel generator 120 without exposing the liquid reactant 244 to other system components. In other words, the liquid reactant 244 is preferably isolated within the fuel generator 120 throughout the entire pumping process. This is preferably accomplished by isolating the fluid-contacting components within a first subassembly 200 and by isolating all other components (particularly the actuating components) of the pump within a second subassembly 300, wherein the first subassembly 200 is incorporated within the fuel generator 120 and the second subassembly 300 is incorporated within the fuel cell arrangement 140. In doing so, the pump assembly of the present invention may present several advantages. First, by isolating the fluid-contacting components within the first subassembly 200, the fuel generator 120 (which incorporates the first subassembly 200) may be made at a substantially low enough cost to be a single use disposable product. Secondly, by retaining the reactants entirely within the first subassembly 200 (and therefore the fuel generator 120), chances of leakage and subsequent damage to a user or surrounding equipment may be reduced. The pump assembly preferably forms a positive displacement pump, but may alternatively include an axial flow pump, a gravity pump, an electro-osmosis pump, or any other pump wherein the fluid-contacting components may be isolated from the actuating components.

Figure 2:
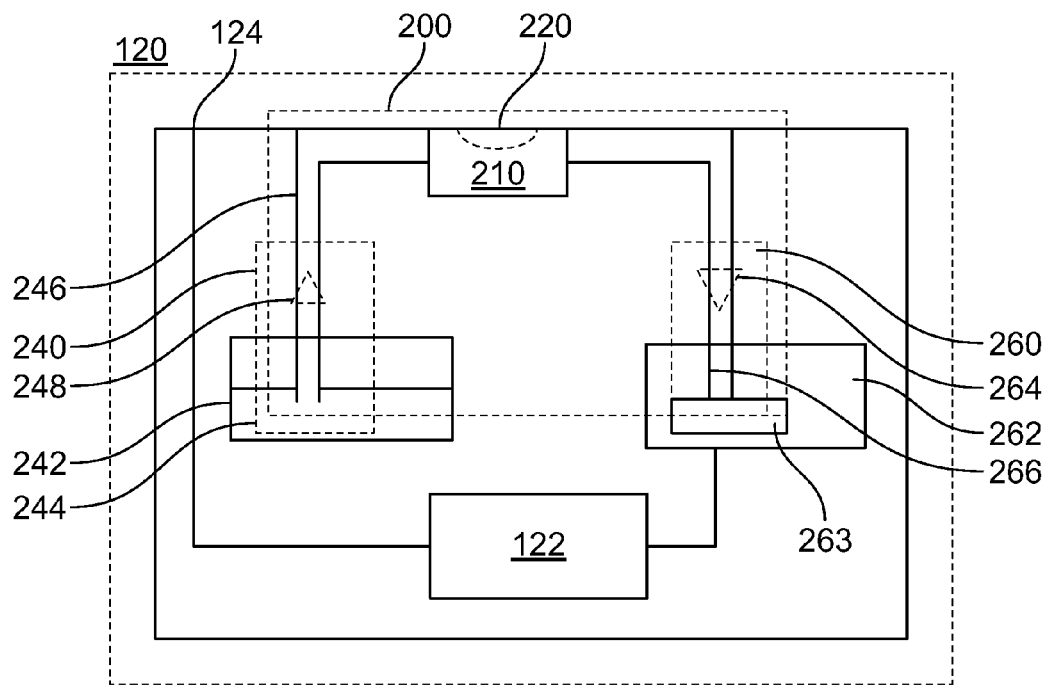
FIG. 2 is a schematic representation of a fuel generator incorporating the first subassembly of the pump assembly.
Figure 3:
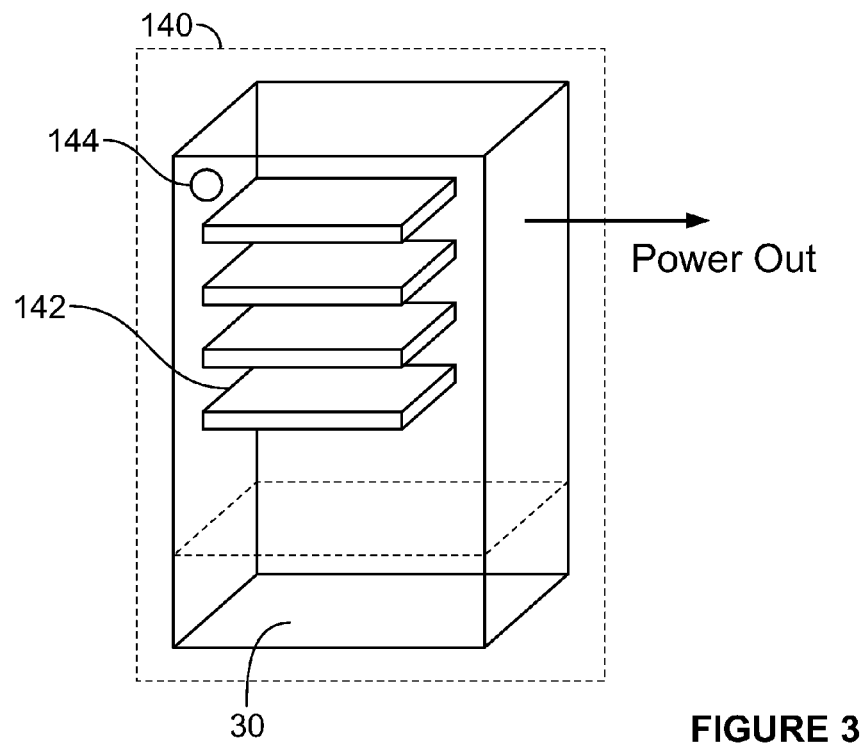
FIG. 3 is a schematic representation of a fuel cell stack incorporating the second subassembly 300 of the pump assembly.

The fuel cell system 100 that utilizes the pump assembly preferably includes a fuel generator 120 and a fuel cell arrangement 140. The fuel cell system 100 is preferably a hydrogen fuel cell system 100, but may alternatively be any other system that converts a fuel into electricity. Likewise, as shown in FIG. 3, the fuel cell arrangement 140 is preferably any fuel cell arrangement (with one or more fuel cells arranged in a stack, in series, in parallel, etc.) that converts hydrogen gas to electricity, but may alternatively convert any other type of fuel to electricity. Similarly, the fuel generator 120 is preferably a hydrogen generator (e.g. a sodium borohydride hydrogen generator or an aluminum hydride hydrogen generator), but may alternatively be any other fuel generator 120. As shown in FIG. 2, the fuel generator 120 preferably contains a liquid reactant 244, contained in a liquid storage area, and a solid reactant, contained in a reaction area, wherein the liquid reactant 244 is pumped to the reaction area to react with the solid reactant and produce hydrogen gas and waste products, which are passed through a product collection area 122 that filters out the hydrogen gas. The liquid reactant 244 is preferably an acid solution (e.g. citric acid or sulfuric acid), more preferably a diluted acid-water solution, but may alternatively be an anti-freeze solution (ethylene glycol, propyl glycol), combination thereof, or water. The solid reactant preferably includes sodium borohydride, but may alternatively include aluminum hydride or any suitable hydrogen storage material that reacts to produce hydrogen. By using the pump assembly of the present invention, substantially all fluid except the fuel (e.g. H2 gas) should be contained inside the fuel generator 120 at all times during the operation of the fuel generator 120. The fuel is preferably the only fluid allowed to flow out of the fuel generator 120, and preferably substantially flows into the fuel cell arrangement 140 from an outlet 124 in the fuel generator 120 to an inlet 144 in the fuel cell arrangement 140, wherein the fuel generator 120 outlet 124 and fuel cell inlet 144 are fluidly coupled.

The First Subassembly

Figure 4:
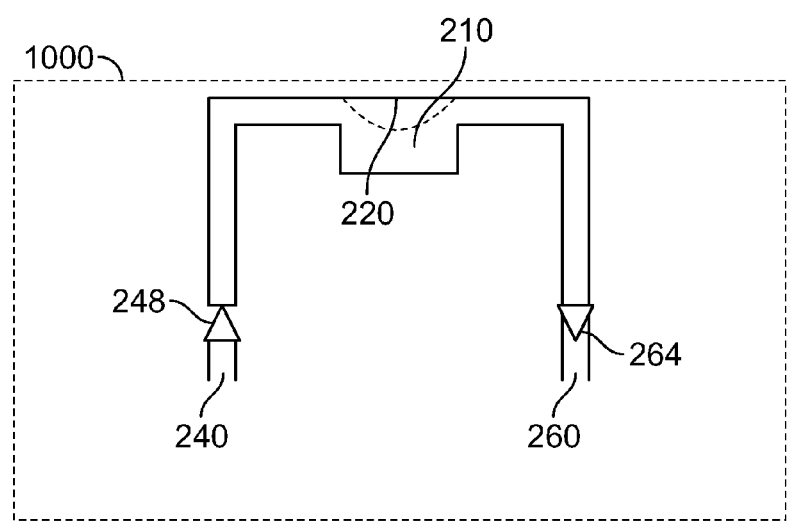
FIG. 4 is a schematic representation of the first subassembly.

As shown in FIG. 4, the first subassembly 200 of the pump includes an inlet 240, an outlet 260, a fluid conduit 210, a diaphragm 220, and an actuation point 280. The first subassembly 200 functions to pump a liquid reactant 244 from a liquid reactant storage area 242 to a reaction area containing a second reactant. The first subassembly 200 is preferably incorporated into a hydrogen generator (e.g. a sodium borohydride or aluminum hydride system), but may alternatively be incorporated into or removably coupled to any fuel generator 120. Furthermore, the first subassembly 200 functions to isolate the liquid reactant 244 within the hydrogen generator, wherein the pumped liquid reactant 244 is substantially retained within the hydrogen generator during the pumping process.

The inlet 240 of the first subassembly 200 functions to fluidly couple the fluid conduit 210 to the liquid reactant 244 in the liquid reactant storage area 242. The inlet 240 is preferably a portion of a tube 246 located within the liquid reactant storage area 242, but may alternatively be a wick or membrane fluidly coupled to a liquid reactant storage area outlet 260. The inlet 240 preferably includes a passive, one-way valve 248 that allows fluid flow out of the liquid reactant storage area 242 and prevents fluid flow into the liquid reactant storage area 242. However, the inlet 240 may alternately include an active one-way valve, an active two-way valve, or no valves at all. The first subassembly preferably includes one inlet 240, but may alternatively include any suitable number of inlets.

The outlet 260 of the first subassembly 200 functions to fluidly couple the fluid conduit 210 to the reaction area and to transfer liquid reactant 244 from the first subassembly 200 to the reaction area. The outlet 260 is preferably a nozzle 266 located within the reaction area 262 proximal to the solid reactant, but may alternatively be a tube or wick fluidly coupled to the inlet 240 of the reaction area. The outlet 260 preferably includes a passive, one-way valve 264 that allows fluid flow out of the first subassembly 200 and prevents fluid flow into the first subassembly 200. However, the outlet 260 may alternately include an active one-way valve, an active two-way valve, or no valves at all. The first subassembly preferably includes one outlet, but may alternatively include two outlets, three outlets, or any number of outlets, wherein the additional outlets may be disposed in the reaction area or in other areas of the fuel generator 120 (e.g. a product collection area or the outlet of the reaction area).

The fluid conduit 210 of the first subassembly functions to contain the packet of liquid reactant being pumped, and may cooperate with the diaphragm to generate the pumping pressures. The fluid conduit 210 is preferably a pumping chamber, but may alternatively be a tube. The fluid conduit 210 is fluidly coupled to the diaphragm, the inlet(s) and the outlet(s). The diaphragm preferably defines a portion of the fluid conduit 210, more preferably a wall of the fluid conduit 210. The inlet and outlet are preferably positioned on opposing sides of the fluid conduit 210, but may alternatively be positioned in any suitable position. In one specific embodiment, the fluid conduit 210 is a substantially rigid prismatic pumping chamber, wherein the diaphragm forms the chamber wall most proximal to the first subassembly exterior, the inlet is located on a wall adjacent the diaphragm, and the outlet is located on a wall opposing the inlet. In a second specific embodiment, the fluid conduit 210 is a substantially flexible tube, wherein the diaphragm is a longitudinal portion of the tube and the first and second ends of the tube form the inlet and outlet, respectively. The first subassembly 200 preferably includes one fluid conduit 210, but may alternatively include any suitable number of fluid conduit 210s.

The diaphragm 220 of the first subassembly 200 functions to pump a packet of liquid reactant 244 from the inlet 240 to the outlet 260 through the fluid conduit 210. The diaphragm 220 is preferably fluidly coupled to the fluid conduit 210, the inlet 240, and the outlet 260, and is preferably located between the inlet valve and the outlet valve. The diaphragm 220 is preferably disposed near the exterior of the first subassembly 200, more preferably near the exterior of the fuel generator 120. However, the diaphragm 220 may alternately be disposed toward the interior of the first subassembly 200. The diaphragm 220 preferably includes a piece of flexible material 222 fluidly coupled to fluid conduit 210, wherein flexion of the diaphragm 220 toward the interior of the fluid conduit 210 (flexed state) creates a positive pressure that forces any liquid reactant 244 contained within the fluid conduit 210 through the outlet (preferably the outlet valve), and relaxation of the diaphragm 220 (unflexed state) creates a negative pressure that pulls liquid reactant 244 through the inlet (preferably the inlet valve) into the fluid conduit 210. Alternately, the diaphragm 220 may include a piece of flexible material 222 fluidly coupled to the fluid conduit 210, wherein flexion of the diaphragm 220 toward the exterior of the first subassembly 200 creates a negative pressure that pulls liquid reactant 244 through the inlet valve and relaxation or flexion of the diaphragm 220 toward the interior of the first subassembly 200 pushes liquid reactant 244 through the outlet valve. The diaphragm 220 may also include a section of flexible tubing 224, wherein the tubing fluidly couples the inlet 240 to the outlet 260. In this case, the diaphragm 220 may move packets of liquid reactant 244 by being periodically radially occluded, wherein the radial occlusion moves to push liquid reactant 244 out of the outlet 260 and pull liquid reactant 244 in through the inlet 240 (e.g. via peristaltic pumping). The radial occlusion is preferably accomplished by flexing a portion of the diaphragm 220 toward the opposing wall of the diaphragm 220. Reciprocation of the diaphragm 220 is preferably achieved by repeated flexion of the diaphragm 220. However, the diaphragm may alternatively be a substantially rigid conduit (e.g. a porous material, capillary tube, membrane, microchannel, etc.), wherein the diaphragm facilitates the movement of liquid reactant through the diaphragm when a voltage is applied across the diaphragm, preferably to the inlet and outlet (e.g. via electro-osmosis). The diaphragm 220 is preferably made from a polymer, and more preferably a polymer with a high melting temperature to withstand the high temperatures generated by the liquid- and solid-reactant reaction. The diaphragm 220 may additionally or alternatively include metal, such as a metal sheet or metal lining. Examples of materials that the diaphragm 220 may be made of include silicone rubber, polyethylene, PVC, PEEK, PTFE, aluminum, copper, cobalt, nitinol, magnetite, etc.

The actuation point 280 of the first subassembly 200 functions to couple with the second subassembly 300 to facilitate liquid reactant pumping from the inlet 240 to the outlet 260. The actuation point 280 is preferably positioned on the diaphragm 220, and more preferably forms a portion of the diaphragm, such that components of the second subassembly 300 directly contact the diaphragm 220. However, the actuation point 280 may alternatively be located on an auxiliary component 290, contained within the first subassembly 200, wherein the second subassembly 300 actuates the auxiliary component 290, which actuates the diaphragm 220. The auxiliary component 290 may additionally include a return element 292 that returns the auxiliary component 290 to a resting position that allows the diaphragm 220 to be in an unflexed state.

Figures 7A, 7B:
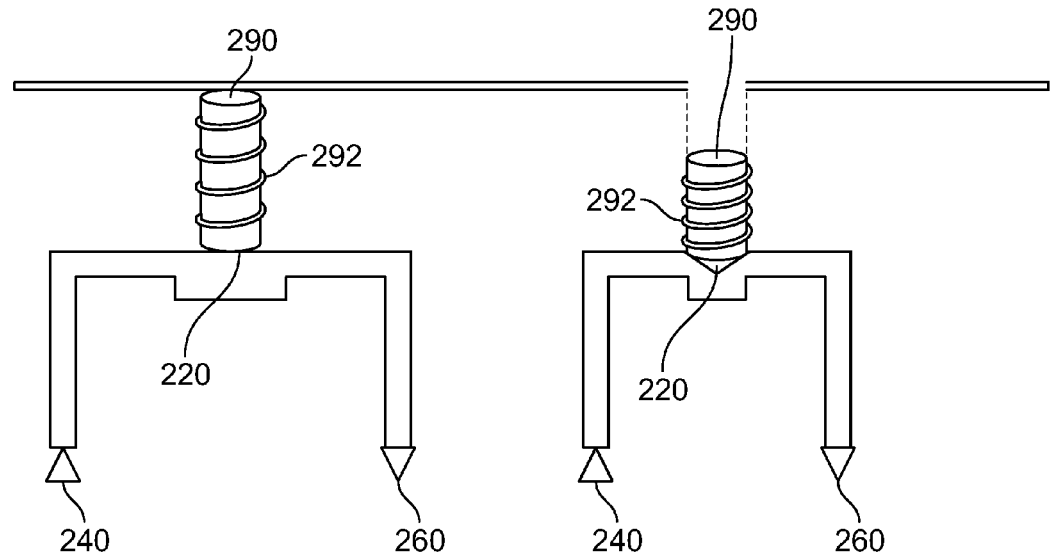
FIGS. 7A and 7B are schematic representations of the first subassembly with a first embodiment of an auxiliary component including a return element, wherein the diaphragm is in an unflexed state and a flexed state, respectively.

In a first embodiment of the auxiliary component 290 (shown in FIGS. 6A and 6B), the auxiliary component 290 is preferably a rod slidably coupled to both the diaphragm 220 and the exterior of the first subassembly 200, more preferably to the exterior of the fuel generator 120, wherein the actuation point 280 is on the end of the rod distal to the diaphragm 220, such that the second subassembly 300 linearly actuates the rod to extend and retract, flexing and unflexing the diaphragm 220, respectively. The rod preferably further includes a spring as a return element 292, allowing the rod to retract back to a resting position (as shown in FIGS. 7A and 7B). In a first embodiment, the rod is preferably mechanically coupled to the diaphragm 220 and the second subassembly 300, such that a force applied against the rod by the second subassembly 300 translates to a force that flexes the diaphragm 220. However, the rod may also be magnetically coupled to the second subassembly 300 and mechanically coupled to the diaphragm 220, wherein a change in the magnetic field of the second assembly results in linear translation of the rod against the diaphragm 220, flexing the diaphragm.

Figure 8:
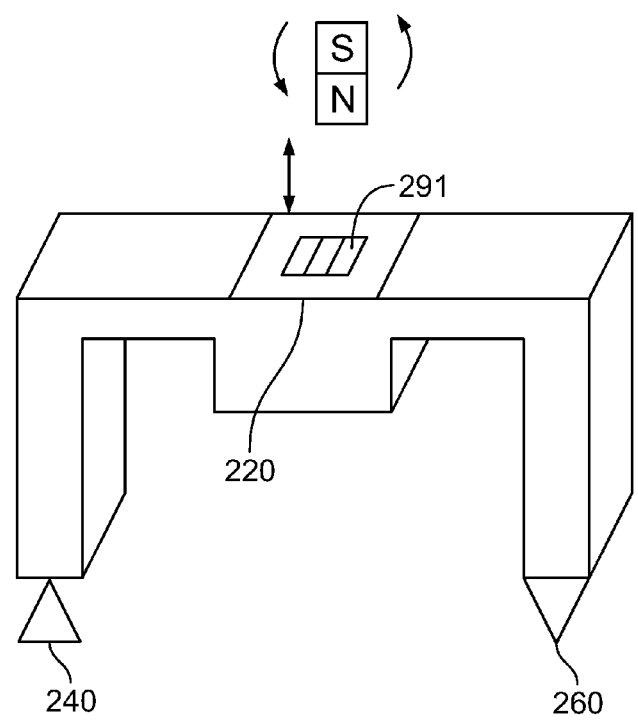
FIG. 8 is a schematic representation of the first subassembly with a second embodiment of an auxiliary component.

In a second embodiment, as shown in FIG. 8, the auxiliary component 290 may alternately not include a rod at all, but be a piece of magnetic material 291 coupled to the diaphragm 220 such that changes in a magnetic field applied by the second subassembly 300 results in movement of the diaphragm 220 as the magnetic material responds to the changes. In this embodiment, the elasticity of the diaphragm 220 is preferably the return element 292, but a spring or set of springs may also be disposed on the diaphragm 220 to cause it to return to an unflexed state when not in operation.

Figure 18:
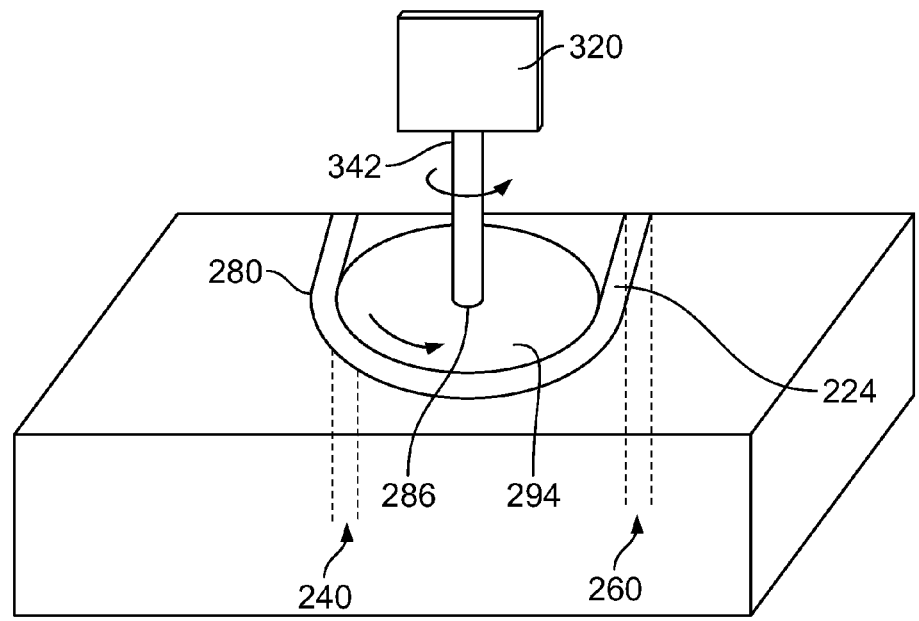
FIG. 18 is a schematic representation of the first subassembly (bottom) coupled to the second subassembly 300 (top), wherein the second subassembly 300 includes a first embodiment of a rotational actuator, shown in a coupled state.

In a third embodiment, as shown in FIG. 9, the auxiliary component 290 may alternately be a rotor 294, wherein the actuation point 280 is substantially in the center of the rotor 294 end face and the diaphragm 220 is slidably disposed about a portion of the rotor circumference 296, such that the diaphragm 220 substantially contacts the portion of the rotor circumference for a majority of the operation time. A separate actuator, contained within the fuel cell system, preferably actuates the rotor 294. In this embodiment of the auxiliary component 290, the rotor 294 preferably includes one or more rollers 297 disposed on the exterior of the rotor about the rotor circumference, such that the rollers 297 protrude radially from the rotor 294, wherein the rollers 297 rotate with the rotor 294. This embodiment is preferably used with the tube 224 embodiment of the diaphragm 220. When the roller 297 contacts the diaphragm 220 during the rotor rotation, the roller protrusion 297 pushes against the portion of the diaphragm 220 closest to the rotor 294, thereby flexing a portion of the diaphragm to occlude the diaphragm 220 (tube 224). As the rotor 294 rotates, the protrusion and occlusion move with the rotor 294, effectively pushing any fluid ahead of the occlusion in the direction of rotor rotation. As shown in FIG. 9B, this embodiment may additionally include a position retention (e.g. ratcheting mechanism) that allows only rotation away from the liquid reactant storage area 242, preventing backward rotation caused by pressure generated by the reaction between the liquid- and solid-reactants. This embodiment may additionally include a return element 292 that removes the couple between the rotor 294 and the diaphragm 220 when not coupled to the second subassembly 300. As shown in FIGS. 9C and 9D, an example of such a return mechanism is a set of springs coupled to the interior rotor end face (the rotor 294 end face furthest from the exterior of the first subassembly 200). These springs are preferably soft enough to be easily compressed when the first subassembly 200 is coupled to the second subassembly 300, but are stiff enough to push the rotor 294 out of the operative plane of rotation when the first subassembly 200 is decoupled from the second subassembly 300, effectively removing the couple between the rotor 294 and the diaphragm 220 when the fuel cell system 100 is not in operation. The rotor and diaphragm couple is preferably maintained when the fuel cell system 100 is not in operation. However, in a variation of this embodiment (shown in FIG. 18) both rotor 294 and the roller protrusion are part of the second assembly, effectively removing the coupling between the rotor and the diaphragm 220 when the fuel cell system 100 is not in operation.

Figure 19A:
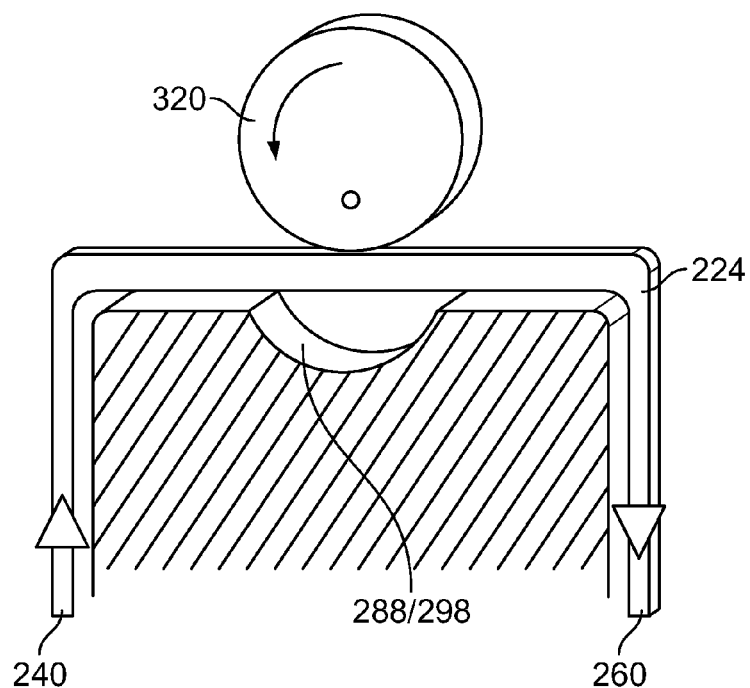
FIGS. 19A and 19B are schematic representations of the first subassembly (bottom) coupled to the second subassembly 300 (top), wherein the second subassembly 300 includes a second embodiment of a rotational actuator, shown in an uncoupled state and a coupled state, respectively.

In a fourth embodiment, as shown in FIG. 19A, the auxiliary component 290 is a concave groove 298 disposed on the side of the diaphragm 220 most interior to the first subassembly 200, such that the auxiliary component 290 is concave toward the exterior of the first subassembly 200 and the diaphragm 220 is disposed between the auxiliary component 290 and the exterior of the first subassembly 200. This auxiliary component embodiment is preferably used with the tube embodiment of the diaphragm 220. In this embodiment, the entire auxiliary component 290 is the actuation point 280, wherein a component of the second subassembly 300 compresses a portion of the diaphragm 220 to occlude the diaphragm against the auxiliary component 290 (groove 298).

In a fifth embodiment, the auxiliary component 290 includes a pair of electrical contacts (electrodes) contacting the diaphragm 220, more preferably contacting the diaphragm near the inlet 240 and outlet 260, respectively. The negative electrode is preferably located near the inlet and the positive electrode near the outlet, but the electrode pair may have any other suitable orientation or positioning. This auxiliary component 290 is preferably utilized with the electro-osmosis embodiment of the diaphragm 220. The auxiliary component preferably electrically couples the actuator, wherein the voltage between the electrode pair is brought to the same voltage as the actuator, effectively applying a voltage over the diaphragm 220 to pump the liquid reactant from the inlet to the outlet.

The Second Subassembly

The second subassembly 300 of the pump includes an actuator 320 that functions to effect pumping within the first subassembly 200. The actuator 320 preferably functions to actuate the flexion of the diaphragm 220, but may alternatively effect pumping in any suitable manner. The second subassembly 300 may additionally include a translational member, which functions to mechanically translate motion from the actuator 320 to the actuation point 280. The second subassembly 300 is preferably incorporated into a fuel cell arrangement 140, but may alternatively be clipped, plugged, or otherwise coupled to a fuel cell. Alternately, the second subassembly 300 may be a stand-alone component and not be incorporated with any component of the fuel cell system 100. The fuel stack preferably converts hydrogen gas to electricity, but may alternatively convert any other fuel to electricity.

Figures 16A, 16B:
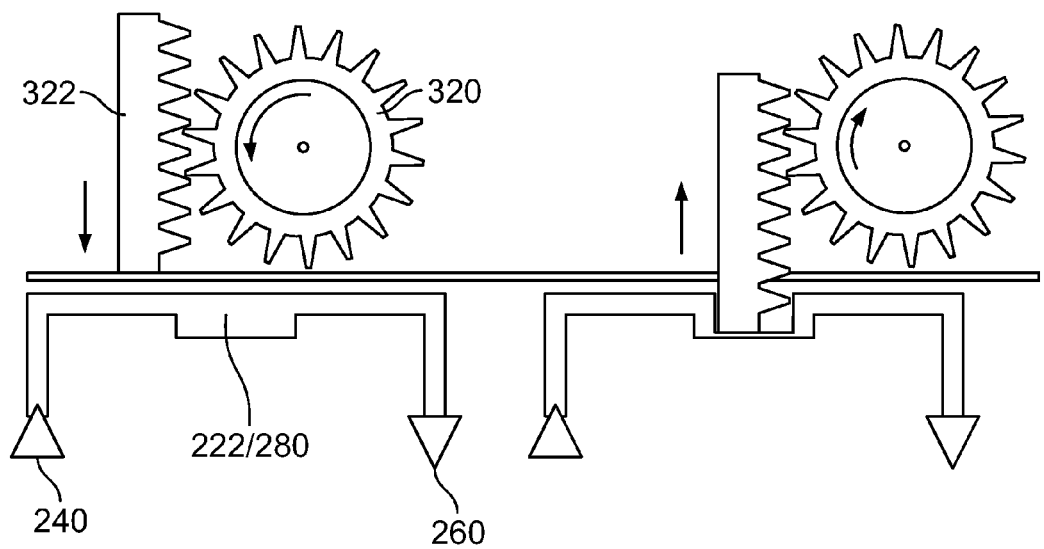
FIGS. 16A and 16B are schematic representations of the first subassembly (bottom) coupled to the second subassembly 300 (top), wherein the second subassembly 300 includes a sixth embodiment of a linear actuator, shown in a retracted state and an extended state, respectively.

The actuator 320 of the second subassembly 300 functions to actuate the diaphragm 220 in the first subassembly 200. This actuation is preferably achieved after the first and second subassemblies are coupled together by the connector 500, and after a signal indicating the initiation of fuel production (e.g. a start signal) has been received. The actuator 320 is preferably a mechanical actuator, but may alternatively be a hydraulic actuator or an electrical actuator. The actuator 320 is preferably powered electrically, wherein electricity is supplied to the actuator 320 by an auxiliary power source, such as a rechargeable battery 400 (shown in FIG. 5). To achieve actuation of the diaphragm 220, the actuator 320 preferably actuates a translational member 340, included in the second subassembly 300, that physically couples with the actuation point 280 in the first subassembly 200 to reciprocate the diaphragm 220. The actuator 320 is preferably a linear actuator 322 (as shown in FIGS. 15 and 16) that moves the translational member 340 (e.g. pump plunger 322b) along the longitudinal axis of the plunger 322b, but may alternatively be a rotational actuator that rotates the translational member 340 about the rotational axis of the translational member 340. The linear actuator 322 is preferably used to actuate the diaphragm 220 directly, wherein the translational member 340 extends to flex the diaphragm 220, and retracts to relax the diaphragm 220. The translational member 340 preferably substantially contacts the diaphragm 220 throughout the pumping cycle, but may alternatively only contact the diaphragm 220 when flexing the diaphragm 220. The linear actuator 322 may also be used with the rod embodiment of the auxiliary component 290, wherein the translational member 340 couples to the end of the rod distal from the diaphragm 220 (actuation point). The rotational actuator is preferably used with the rotor embodiment of the auxiliary component 290, wherein the translational member 340 couples with the rotating axis of the rotor (the auxiliary component) at the actuation point 286, or with the grooved embodiment 298 of the auxiliary component 290, wherein the translational member 340 couples with the groove 288. The translational member 340 is preferably capable of extending past the exterior of the second subassembly 300, and is preferably a rod 342 with actuation point-coupling features (e.g. hooks, an asymmetric end profile, or a plunger 322b), but may alternatively be a rotor with rollers, a rod attached to a magnet, or include any feature that assists in the actuation of the translational member 340 by the actuator 320. The actuator 320 may alternatively directly actuate the diaphragm 220 by coupling electromagnetically with the actuation point 280, without the use of a translational member 340, or may be electrical couples (electrodes) held at a predetermined voltage, wherein the actuator couples to the electrode pair (auxiliary component) of the first subassembly (e.g. the fifth embodiment). The actuator may alternatively be any suitable actuator that interacts with the first subassembly to induce liquid reactant pumping within the first subassembly.

Figures 10A, 10B:
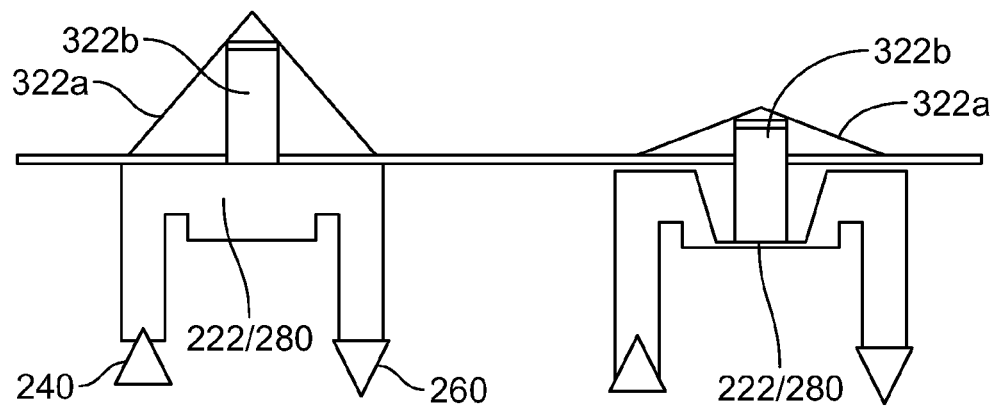
FIGS. 10A and 10B are schematic representations of the first subassembly (bottom) coupled to the second subassembly 300 (top), wherein the second subassembly 300 includes a first embodiment of a linear actuator, shown in a retracted state and an extended state, respectively.

In a first embodiment of the linear actuator 322 (shown in FIGS. 10A and 10B), actuation is achieved by contraction and extension of a shape memory alloy wire connected to a plunger 322b head located at the proximal end of the pump plunger 322b (the translational member 340), wherein the pump plunger 322b extends to push against the actuation point 280 of the first subassembly 200. The shape memory alloy wire is included of a shape memory alloy material, such as a nickel-titanium alloy popularly known as "nitinol". The shape memory alloy material is sensitive to temperature or heat. For example, nitinol temporarily shrinks at a range of temperatures dictated by the composition of the nitinol will expand at a relative lower temperature and return to its original condition. In response to being heated above this shrinkage temperature, the nitinol alloy undergoes a dimensional change, such as a change in its length. In this way, the nitinol wire 322a can undergo a reduction in length and return to its original length repeatedly via repeated temperature cycling above its shrinkage temperature and cooling to below its expansion temperature. The nitinol wire 322a is threaded through the plunger 322b head and attached at either end to the second subassembly 300 by crimp connections. The nitinol wire 322a is located such that when in its contracted phase, the plunger 322b head is in its retracted position; when the nitinol wire 322a is in its expanded phase, the plunger 322b head is in its fully extended position. The crimp connections are connected to electrical wire that is electrically coupled to a rechargeable battery 400.

Figures 11A, 11B:
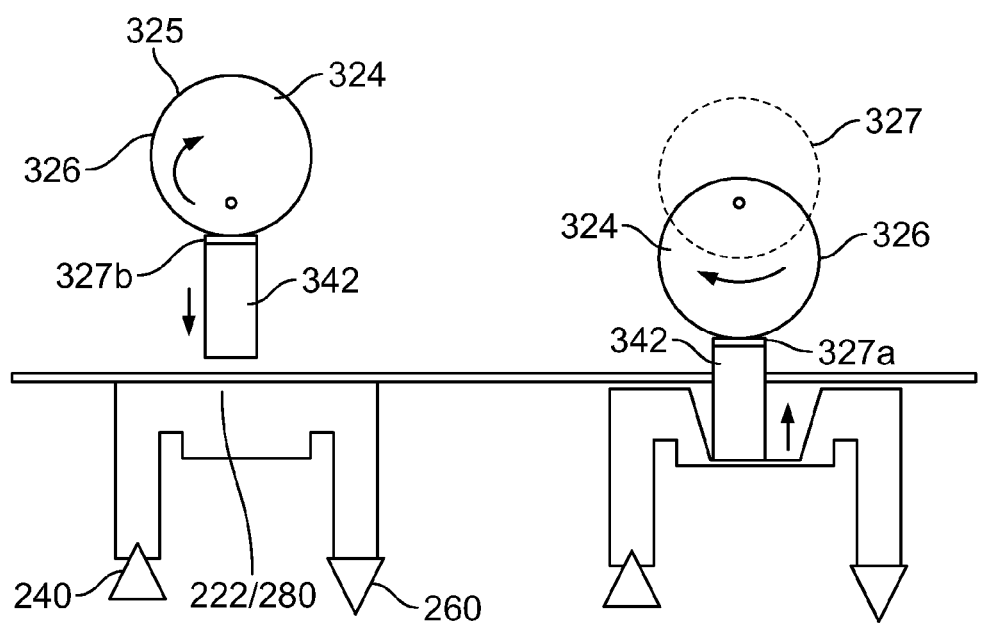
FIGS. 11A and 11B are schematic representations of the first subassembly (bottom) coupled to the second subassembly 300 (top), wherein the second subassembly 300 includes a second embodiment of a linear actuator, shown in a retracted state and an extended state, respectively.
Figures 12A, 12B:
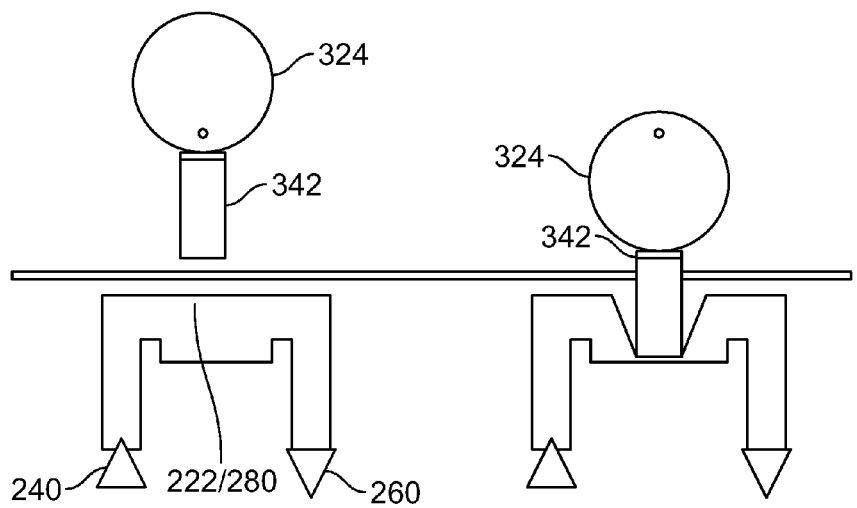
FIGS. 12A and 12B are schematic representations of the first subassembly (bottom) coupled to the second subassembly 300 (top), wherein the second subassembly 300 includes a variation of the second embodiment of a linear actuator, shown in a retracted state and an extended state, respectively.

In a second embodiment of the linear actuator 322 (shown in FIGS. 11A and 11B), linear motion of the translational member 340 is achieved by slidably coupling the translational member 340 to the circumferential surface 325 of a rotating cam 324, wherein a part of the cam 324 strikes the translational member 340 at one or more points on its circular path to extend the translational member 340 partially out of the second subassembly 300. This is preferably accomplished by using a circular cam 324 wherein the axis of rotation is offset from the center of the cam 326, such that rotation of the cam 324 produces an ellipsoidal rotational path 327. The translational member 340 is preferably slidably constrained within the second subassembly 300, such that it can only vary between a fully extended (past the exterior of the second subassembly 300) and fully retracted (contained within the second subassembly 300) state, wherein the translational member 340 extends and retracts along its longitudinal axis. The translational member 340 is coupled to the cam 324 such that the translational member 340 is extended past the second subassembly 300 when the rotational path of the cam reaches a vertex at the couple, and is retracted into the second subassembly 300 when the rotational path of the cam 324 reaches a minor axis at the couple. Alternately, the cam itself may have an eccentric profile that extends the translational member 340 past the exterior of the second subassembly 300 at a point during the cam rotation, as shown in FIGS. 12A and 12B.

Figures 13A, 13B:
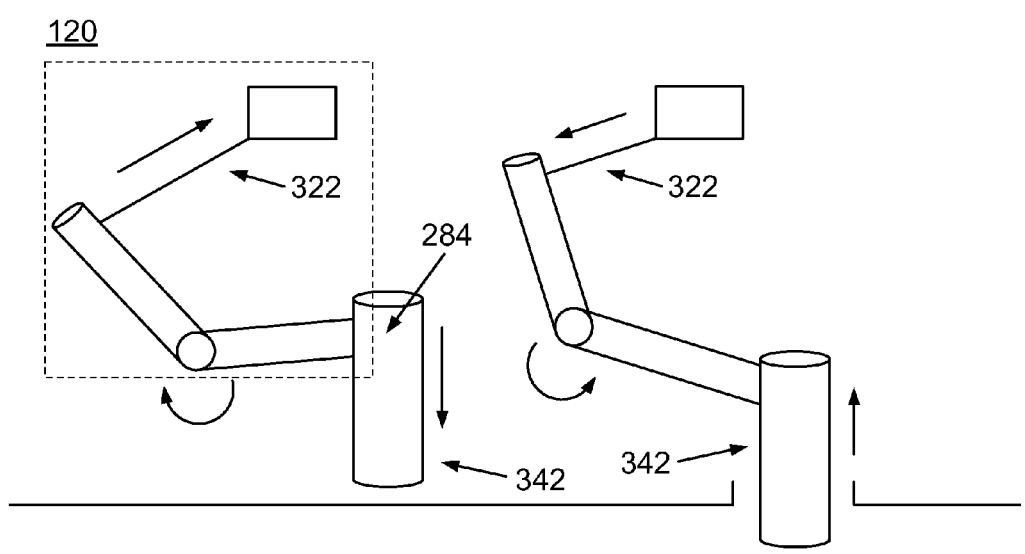
FIGS. 13A and 13B are schematic representations of the first subassembly (bottom) coupled to the second subassembly 300 (top), wherein the second subassembly 300 includes a third embodiment of a linear actuator, shown in a retracted state and an extended state, respectively.

In a third embodiment of the linear actuator (shown in FIGS. 13A and 13B), linear motion of the translational member 340 is achieved by utilizing a linear actuator 322 including a shape memory component, more preferably a Nitinol wire 322a, and a rotating arm coupled to a rod 342. The Nitinol wire 322a is preferably connected to an electrical supply and to an end of the rotating arm. The rotating arm is preferably a rigid member, wherein one end of the rotating arm is preferably coupled to the Nitinol wire 322a, and the other end preferably coupled to the rod 342 end at actuation point 284, preferably through the side of the rod 342. The rotating arm preferably rotates about a point disposed along its length, wherein the rotation point is preferably disposed near the center of the rotating arm length. Upon heating of the Nitinol wire 322a (preferably by running a current through the wire), the wire expands, pushing the end of the rotating arm coupled to the Nitinol wire 322a away from its equilibrium position (the position that the rotating arm is in when the Nitinol wire 322a is not heated). This movement rotates the rotating arm about its rotation point to move actuation point 284, thereby translating the rod 342 along the rod's linear axis. However, since the force application to the rod actuation point 284 is not evenly distributed over the rod end (as the rotating arm is coupled from one side of the rod 342), the second assembly preferably further includes a guide that constrains the rod to move only along its linear axis.

Figures 17A, 17B:
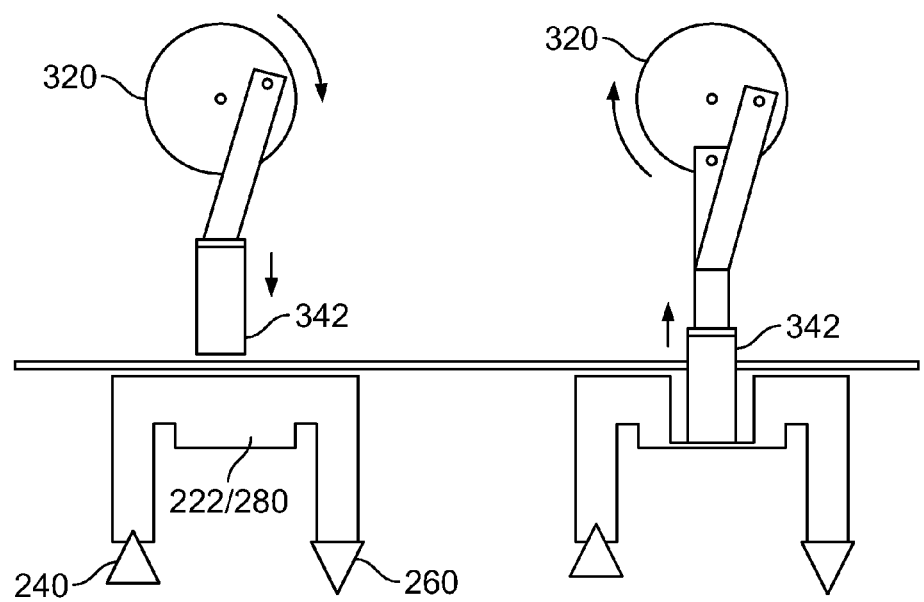
FIGS. 17A and 17B are schematic representations of the first subassembly (bottom) coupled to the second subassembly 300 (top), wherein the second subassembly 300 includes a seventh embodiment of a linear actuator, shown in a retracted state and an extended state, respectively.

The linear actuator 322 may additionally or alternatively be a piezoelectric driver (shown in FIGS. 14A and 14B), a rack and pinion (wherein the actuator 320 drives the pinion, and the translational member 340 is the rack), a lead screw (shown in FIGS. 15A and 15B), a worm-gear (shown in FIGS. 16A and 16B), a belt drive, a two-bar linkage coupled to a cam (shown in FIGS. 17A and 17B), or any other type of actuator 320 that can extend and retract a translational member 340 along its longitudinal axis. Additionally, the translational member 340 may have additional physical properties, such as magnetic properties or piezoelectric properties. For example, in an eighth embodiment of the linear actuator 322, a stepper motor is coupled to a translational member 340 with a magnet at the distal end (i.e. end not coupled to the stepper motor). This embodiment is preferably used with an embodiment of the first subassembly 200 that incorporates magnetic elements (e.g. the diaphragm 220 incorporating a magnetic metal sheet), wherein the magnetic element of the diaphragm 220 is repelled by the translational member 340 such that extension of the translational member 340 repels the diaphragm 220, causing it to flex.

In a first embodiment of the rotational actuator (shown in FIGS. 18A and 18B), rotational motion of the translational member is achieved by coupling the translational member to a rotating motor, such as a drill motor, a DC motor, or an AC motor. In this embodiment, the translational member is preferably a rod, and is preferably coupled to the actuator such that rotation of the actuator rotates the translational member around the longitudinal axis of the translational member 340. The translational member preferably mechanically couples to the rotational axis of the rotor embodiment of the auxiliary component 294 (in the first subassembly 200), such that rotation of the translational member rotates the rotor 294.

Figure 19B:
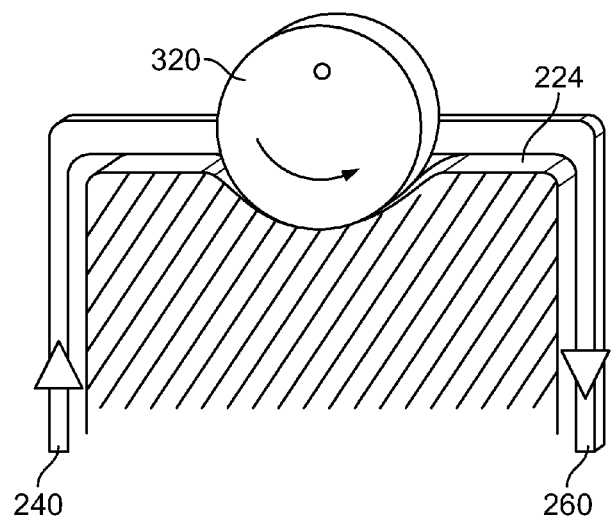
Figures 20A, 20B:
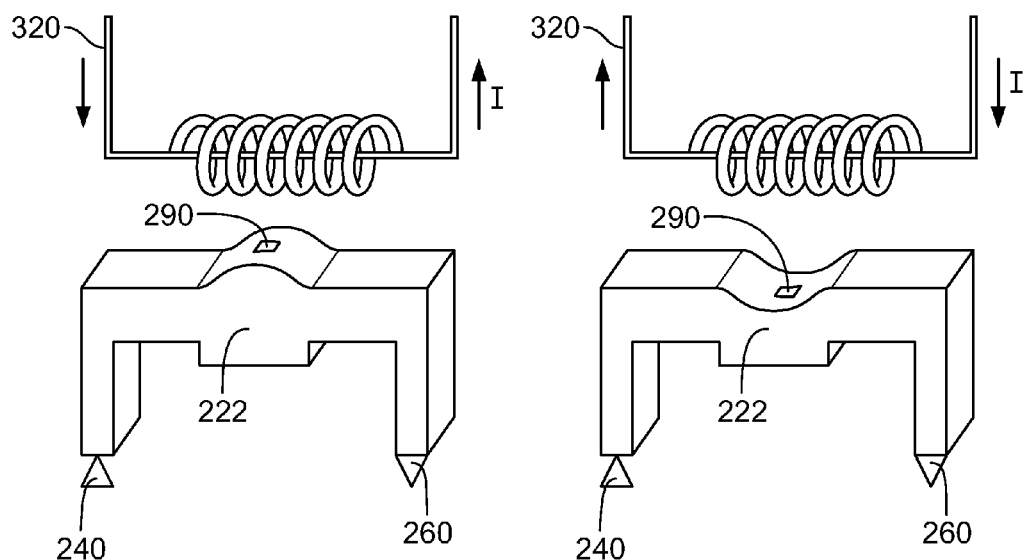
FIGS. 20A and 20B are schematic representations of the first subassembly (bottom) coupled to the second subassembly 300 (top), wherein the second subassembly 300 includes a first embodiment of an electromagnetic actuator, shown in a retracted state and an extended state, respectively.
Figures 21A, 21B:
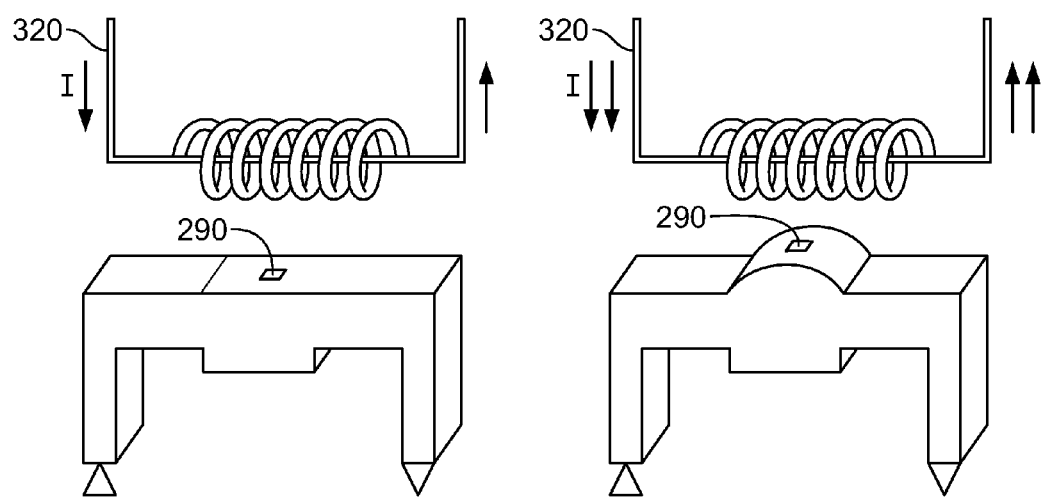
FIGS. 21A and 21B are schematic representations of the first subassembly (bottom) coupled to the second subassembly 300 (top), wherein the second subassembly 300 includes a second embodiment of an electromagnetic actuator, shown in a retracted state and an extended state, respectively.

In a second embodiment of the rotational actuator 320 (shown in FIGS. 19A and 19B), rotational motion of the translational member is achieved by coupling the translational member to a rotating motor, such as a drill motor, a DC motor, or an AC motor. In this embodiment, the translational member is preferably an eccentric rotor and is preferably coupled to the actuator 320 through the end faces of the rotor, such that rotation of the actuator 320 rotates the rotor in a plane parallel to the planes of the end faces. The translational member preferably couples to the groove 298 embodiment of the auxiliary component 290, wherein the eccentric (i.e. protruding) portion of the rotor slides along the length of the groove 298 during a portion of the rotor rotation. Because the diaphragm 220 is preferably disposed between the groove 298 and the exterior of the first assembly when utilizing the groove 298 embodiment, the eccentric portion of the rotor occludes the diaphragm 220 when it couples with the groove 298, effectively occluding the diaphragm 220 to push any fluid in the direction of rotation. The actuator 320 preferably rotates the rotor in the direction of the reaction chamber, such that liquid reactant 244 is pushed toward the reaction chamber.

In a first embodiment of the electromagnetic actuator, the actuator is a mechanism capable of producing a changing magnetic field. More preferably, the actuator is a mechanism that can change the direction of a magnetic field, such as a solenoid. This actuator is preferably used with a magnetic embodiment of the first subassembly 200 (e.g. the diaphragm 220 incorporating a magnetic sheet or the magnetic rod embodiment of the auxiliary component 290). The actuator 320 repels the magnetic element of the first subassembly with a first generated electromagnetic field, and attracts the magnetic element with a second generated electromagnetic field, wherein the first and second electromagnetic fields are opposing magnetic fields. Cycling between the first and second electromagnetic fields results in reciprocation of the diaphragm 220.

In a second embodiment of the electromagnetic actuator, the actuator is a mechanism capable of producing a changing magnetic field. More specifically, the actuator is a mechanism capable of changing the magnitude of the magnetic field. This actuator is preferably used with a magnetic embodiment of the first subassembly 200 (e.g. the diaphragm 220 incorporating a magnetic sheet 294 or the magnetic rod embodiment of the auxiliary component 290) further incorporating a return element 292 that allows return of the diaphragm 220 to an equilibrium position (e.g. the elasticity of the diaphragm 220, a spring coupled to the magnetic rod). The actuator 320 either repels or attracts the magnetic element of the first subassembly 200 with a first generated electromagnetic field, then lowers the magnitude of the generated field to a second generated electromagnetic field to allow the return element 292 to return the diaphragm 220 to the equilibrium position. Cycling the generated field between a strong and weak field results in reciprocation of the diaphragm 220. Alternatively, the first and second fields may have opposing directions, or differ in any other suitable parameter.

As a person skilled in the art will recognize from the previous detailed description and from the figures and claims, modifications and changes can be made to the preferred embodiments of the invention without departing from the scope of this invention defined in the following claims.

The Connector

The connector 500 of the pump assembly functions to removably couple the first subassembly 200 to the second subassembly 300. The connector 500 preferably utilizes a magnetic couple, wherein the second subassembly 300 includes a magnet that is magnetically attracted to a metal plate included within the first subassembly 200. However, the connector 500 may alternately be a mechanical couple, wherein the first subassembly 200 includes a protrusion that slides into and removably clips into a groove in the second subassembly 300 (e.g. a tongue and groove joint). Other examples of mechanical couples include hooks, clips, adherent, screws, or any other suitable couple that removably couples the first subassembly 200 to the second subassembly 300.

As a person skilled in the art will recognize from the previous detailed description and from the figures and claims, modifications and changes can be made to the preferred embodiments of the invention without departing from the scope of this invention defined in the following claims.

We claim:

1. A method of supplying fuel to operate a fuel cell system comprising:
   a fuel cartridge including a liquid reactant dispenser containing a liquid reactant and a reaction chamber distinct from the liquid reactant dispenser, a pump assembly including:
   a first subassembly including: a fluid conduit, an inlet fluidly coupled to the liquid reactant dispenser and the fluid conduit, an outlet fluidly coupled to the reaction chamber and the fluid conduit, a diaphragm that defines a portion of the fluid conduit and that flexes to pump the liquid reactant from the inlet to the outlet, and an actuation point coupled to the diaphragm; wherein the liquid reactant is substantially contained within the first subassembly during pumping; and,
   a second subassembly, couplable to the first subassembly and fluidly isolated from the liquid reactant, the second subassembly including an actuator that couples to the actuation point, wherein operation of the actuator causes diaphragm flexion;
   flexing the diaphragm between a flexed and unflexed state; and,
   wherein the flexed state creates a positive pressure within the fluid conduit so as to facilitate the egress of the liquid reactant from the outlet, and the unflexed state creates a negative pressure within the fluid conduit the facilitate ingress of liquid reactant from the inlet.

2. The method of claim 1, the fluid conduit comprising substantially rigid prismatic pumping chamber, wherein the diaphragm forms a chamber wall proximal to an exterior wall of the first subassembly, the inlet being located on a wall adjacent to the diaphragm, and the outlet being located on a wall opposing the inlet.

3. The method of claim 2, wherein the inlet and outlet include a one-way inlet valve and outlet valve, respectively.

4. The method of claim 1, wherein the spring force of the diaphragm transitions the diaphragm from the flexed to the unflexed state.

5. The method of claim 1, the fluid conduit comprising a substantially flexible tube, wherein the diaphragm is a longitudinal portion of the tube and first and second ends of the tube form the inlet and outlet, respectively.

6. The method of claim 5, the first subassembly further including an auxiliary component that couples the actuation point to the diaphragm, the auxiliary component being a rotor, wherein the actuation point is substantially in the center of the rotor end face and the diaphragm is slidably disposed about a portion of the rotor circumference, such that the diaphragm substantially contacts the portion of the rotor circumference for a majority of the operating time, said method comprising rotating the rotor.

7. The method of claim 2, wherein the auxiliary component comprises a concave groove disposed on the diaphragm most interior to the first subassembly, such that the auxiliary component is concave toward the center of the exterior of the first subassembly and the diaphragm is disposed between the auxiliary component and the exterior of the first subassembly,
said method comprising compressing a portion of the diaphragm to occlude the diaphragm against the concave groove.

8. The method of claim 1, the first subassembly further including an auxiliary component that couples the actuation point to the diaphragm, the auxiliary component being a reciprocating rod disposed between the exterior of the first assembly and the diaphragm, with a diaphragm end and a distal end, wherein the distal end is the actuation point, wherein the rod transfers a force from the actuator to the diaphragm.

9. The method of claim 1, wherein the actuator comprises a shape memory alloy.

10. The method of claim 1, wherein actuator comprises a rotatable cam, said cam having an axis of rotation offset from center.

11. The method of claim 1, wherein actuator comprises a piezoelectric driver.

12. The method of claim 1, wherein the diaphragm comprises silicone rubber, polyethylene, PVC, PEEK, PTFE, aluminum, copper, cobalt, nitinol, magnetite, or a combination thereof.

13. The method of claim 1, wherein the second subassembly further includes a translating member coupled to the actuator, wherein the actuator reciprocates the translating member between two states:
retracted mode wherein the translating member does not transfer substantial force from the actuator to the diaphragm, wherein the diaphragm is in the unflexed state; and
an extended mode wherein the translating member transfers substantial force from the actuator to the actuation point, wherein the diaphragm is in the flexed state;
said method comprising moving the translating member between the retracted mode and the extended mode.

14. The method of claim 13, wherein the translating member contacts the actuation point in retracted mode.

15. The method of claim 13, wherein the translating member is moved between the retracted mode and the extended mode by the application of a changing magnetic field between the second assembly and the diaphragm, said changing magnetic field resulting in a linear translation against the diaphragm, flexing the diaphragm.

16. The method of claim 14, wherein the translating member is a pump plunger.

17. The method of claim 13, wherein the actuator is a mechanical actuator.

18. The method of claim 17, wherein the actuator is a screw actuator, wherein the translating member is the screw.

19. The method of claim 1, wherein the pump assembly further includes a coupling mechanism that removably couples the first subassembly to the second subassembly.

20. The method of claim 19, wherein the coupling mechanism is a tongue and groove couple, wherein the first subassembly includes a tongue and the second subassembly includes a groove.

* * * * *